(12) United States Patent
Fukunishi et al.

(10) Patent No.: US 10,775,542 B2
(45) Date of Patent: Sep. 15, 2020

(54) LIGHTING DEVICE AND DISPLAY DEVICE

(71) Applicant: SHARP KABUSHIKI KAISHA, Sakai, Osaka (JP)

(72) Inventors: Ichiroh Fukunishi, Sakai (JP); Hayato Nakamura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/720,715

(22) Filed: Dec. 19, 2019

(65) Prior Publication Data
US 2020/0200960 A1 Jun. 25, 2020

Related U.S. Application Data (60) Provisional application No. 62/782,643, filed on Dec. 20, 2018.

(51) Int. Cl.
*F21V 7/04* (2006.01)
*F21V 8/00* (2006.01)

(52) U.S. Cl.
CPC .......... *G02B 6/0021* (2013.01); *G02B 6/009* (2013.01); *G02B 6/0075* (2013.01); *G02B 6/0088* (2013.01)

(58) Field of Classification Search
None
See application file for complete search history.

(56) References Cited

U.S. PATENT DOCUMENTS

| | | | | |
|---|---|---|---|---|
| 4,630,895 A | * | 12/1986 | Abdala, Jr. | ............ G02B 6/002 349/62 |
| 5,070,431 A | * | 12/1991 | Kitazawa | ............. G02B 6/0021 362/23.15 |
| 5,590,945 A | * | 1/1997 | Simms | ................. G02B 6/0038 362/623 |
| 2012/0275193 A1 | | 11/2012 | Yoshida et al. | |

FOREIGN PATENT DOCUMENTS

JP 2012-234675 A 11/2012

* cited by examiner

*Primary Examiner* — Vip Patel
(74) *Attorney, Agent, or Firm* — ScienBiziP, P.C.

(57) ABSTRACT

A lighting device includes light sources and a light guide plate having a first side face and a second side face opposite to the first side face. The light guide plate includes a first recess portion in a part of the first side face and a second recess portion in a part of the second side face. The first recess portion and the second recess portion are disposed in a point symmetrical manner with respect to a central position of the light guide plate as a symmetric point. The light sources are arranged in such a manner as to face a portion of the first side face except for the first recess portion and a portion of the second side face except for the second recess portion, and are arranged on a first side face side and on a second side face side in an offset manner.

6 Claims, 6 Drawing Sheets

LIGHTING DEVICE AND DISPLAY DEVICE

CROSS REFERENCE TO RELATED APPLICATION

This application claims priority from U.S. Provisional Patent Application No. 62/782,643 filed on Dec. 20, 2018. The entire contents of the priority application are incorporated herein by reference.

TECHNICAL FIELD

The technology described herein relates to a lighting device and a display device.

BACKGROUND ART

Examples of currently-used liquid crystal display devices include one with a so-called back light device of an edge light type (side light type) in which light sources are disposed on a rear face end of a liquid crystal panel. In the back light device of the edge light type, light from the light sources such as LEDs enters into a light guide plate, propagates inside of the light guide plate, and then exits toward the liquid crystal panel. At this time, a back light device described in Japanese Unexamined Patent Application Publication No 2012-234675 is disclosed as one technique of achieving uniform luminance of light entering into the light guide plate.

The back light device includes a plurality of LEDs spaced apart at a relatively large interval along a light incident end face of a light guide plate. With such a configuration, portion around the light incident end face of the light guide plate that faces adjacent LEDs is likely to be a dark area. Accordingly, the light guide plate includes recesses each depressed to be a V-shape, the recesses being formed at a portion of the light incident end face that faces the adjacent LEDs. The recesses are each configured by a V-shaped inclined face. Light entering the light guide plate from the LEDs is partially reflected by the inclined face, and reflected light reaches regions that are likely to be the dark area described above. Accordingly, even when the adjacent LEDs are spaced apart by a long interval, suppression in production of the dark area around the light incident end face is obtainable in the light guide plate.

The recesses of the light guide plate each include the planar inclined face whose inclination angle is set within a predetermined range. This causes light to be reflected toward the region that is likely to be the dark area. Consequently, if the recesses each include no inclined face as above, light reflected on the recesses is unlikely to reach the regions, so that production of the dark area described above is not suppressive. For instance, when a camera is disposed at a part of an outer periphery of a smartphone in application to the smartphone and the like, such is occasionally performed that an outer periphery of a liquid crystal display device is depressed, and the camera is disposed in the depressed portion. In this case, a recess having a curve along a contour of the camera and a recess surrounding the camera in a rectangular shape are formed on a light incident end face of the light guide plate. At this time, LEDs are arranged along a portion except for the recesses on the light incident end face. As a result, an interval between the adjacent LEDs across the recess becomes long, and thus portions around the light incident end face of the light guide plate that each face the adjacent LEDs are likely to become a dark area. On the other hand, it is difficult to apply the technique described in Japanese Unexamined Patent Application Publication No 2012-234675 to the light guide plate with such recesses for preventing production of the dark area around the light incident end face of the light guide plate.

SUMMARY

The technology described herein was made in view of the above circumstances. An object is to suppress production of a dark area in a light guide plate in a lighting device with the light guide plate and a display device including the lighting device mounted thereon, the light guide plate including a recess portion at a light incident end face thereof.

A lighting device according to the present technology includes light sources; and a light guide plate having a first side face and a second side face opposite to the first side face, the light guide plate being configured to guide light from the light sources; the light guide plate including at least one first recess portion having depressed shape in a part of the first side face and at least one second recess portion having a depressed shape in a part of the second side face. The first recess portion and the second recess portion are arranged in a point symmetrical manner with respect to a central position of the light guide plate as a symmetric point in a plan view, and the light sources are arranged in such a manner as to face a portion of the first side face except for the first recess portion and a portion of the second side face except for the second recess portion, and are arranged on a first side face side and on a second side face side in an offset manner.

According to the technology described herein, an object is to suppress production of a dark area in a light guide plate in a lighting device and a display device including the lighting device mounted thereon, the light guide plate including recess portions at light incident end faces thereof.

DETAILED DESCRIPTION

First Embodiment

Figure 1:
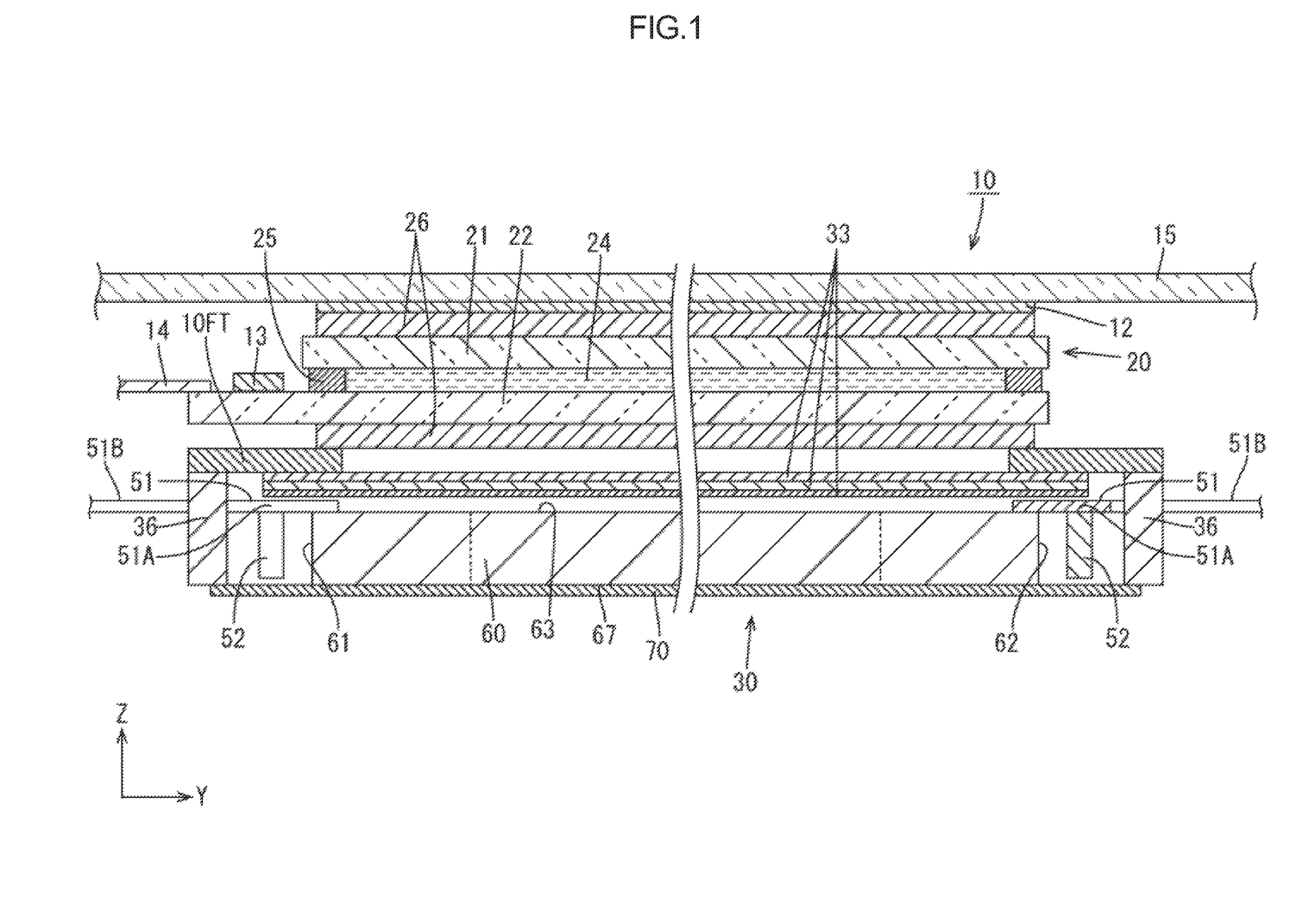
FIG. 1 is a sectional view of a liquid crystal display device according to a first embodiment.
Figure 2:
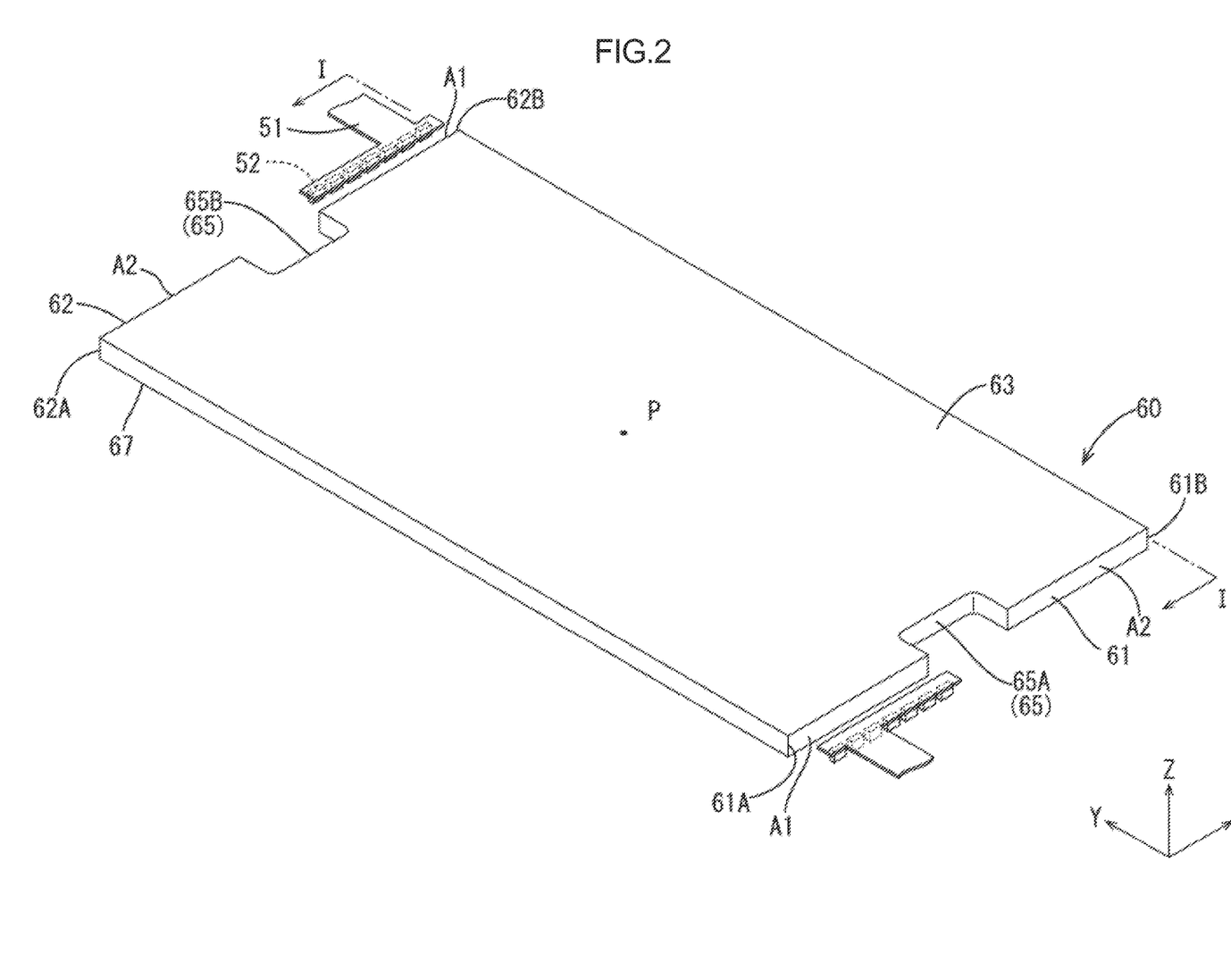
FIG. 2 is a perspective view of a light guide plate and light sources.
Figure 3:
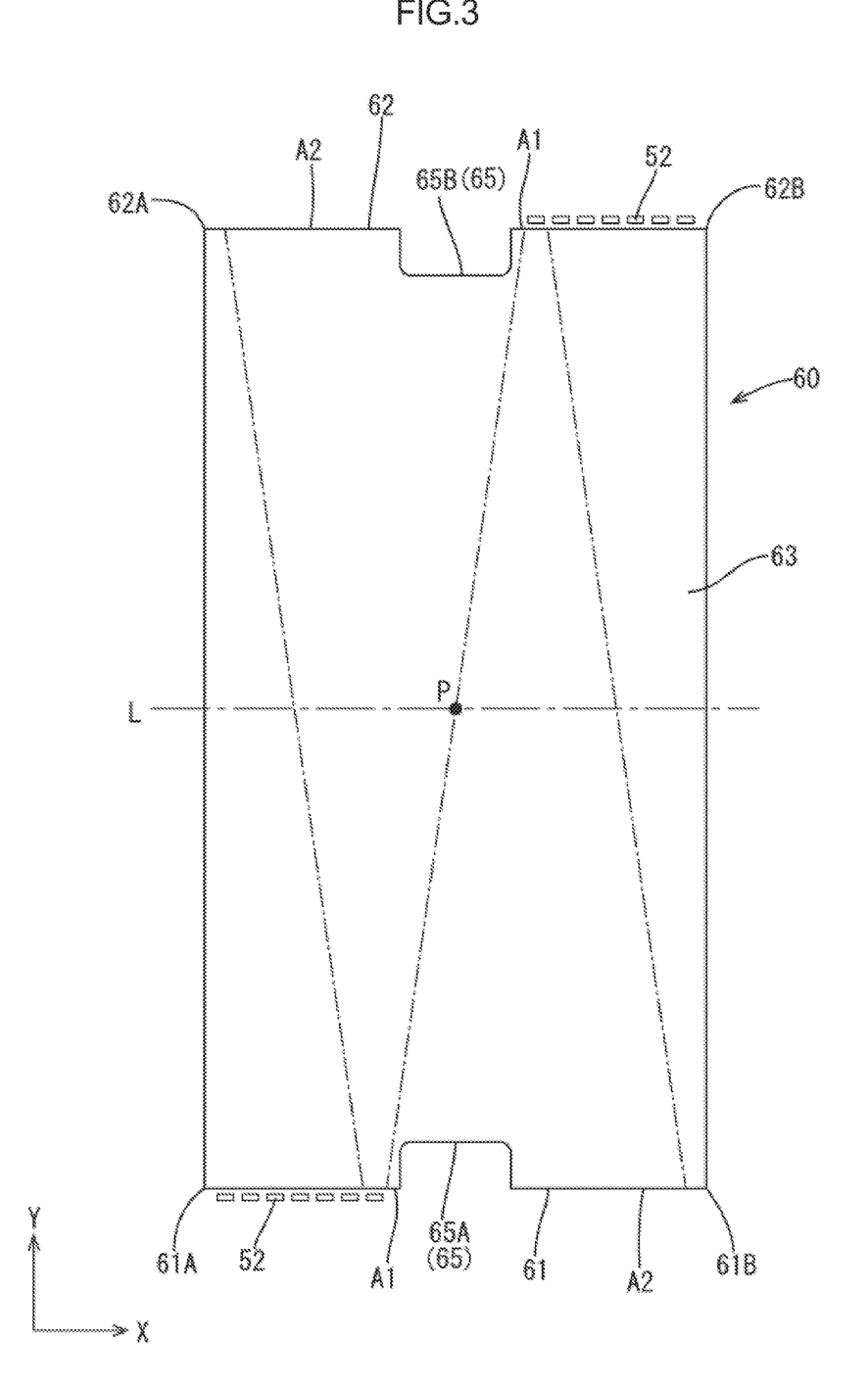
FIG. 3 is a plan view of the light guide plate and the light sources.

The following describes a first embodiment with reference to FIGS. 1 to 3. The present embodiment exemplarily describes a liquid crystal display device (one example of a display device) 10 including a back light device example of a lighting device) that is configured to apply light to a liquid crystal panel 20 (one example of a display panel). Note that each of drawings partially indicates an X-axis, a Y-axis, and a Z-axis, each of which is common to the direction where the drawing is illustrated. Moreover, it is assumed that a +Z-axis direction corresponds to a front side of the liquid crystal display device 10, and a −Z-axis direction corresponds to a rear side thereof.

As illustrated in a sectional view of FIG. 1, the liquid crystal display device 10 includes at least the liquid crystal panel (one example of a display panel) 20 configured to display an image, and the back light device (one example of a lighting device) 30 disposed on a rear side with respect to the liquid crystal panel 20 and applying light for display to the liquid crystal panel 20. The liquid crystal panel 20 and the back light device 30 are fixed with a frame-shaped fixing tape 10FT with light-blocking property. A cover glass 15 is disposed on a front side of the liquid crystal panel 20 in such a manner as to cover the front side thereof entirely.

The cover glass 5 made of tempered glass with high mechanical strength and high impact resistant performance as well as excellent translucency, and protects the liquid crystal panel 20. A rear face of the cover glass 15 and a front face of liquid crystal panel 20 adhere to each other via an adhesive member 12 made of a transparent optical adhesive film such as an optical clear adhesive (OCA).

As illustrated in FIG. 1, the liquid crystal panel 20 includes paired substrates 21, 22, a liquid crystal layer 24, and a sealing portion 25. The liquid crystal layer 24 is disposed in an interior space between the both substrates 21, 22, and contains liquid crystal molecules as a material whose optical property is variable depending electric field application. The sealing portion 25 is disposed between the both substrates 21, 22 in such a manner as to surround the liquid crystal layer 24, thereby sealing the liquid crystal layer 24. One of the substrates (array substrate) 22 includes switching elements (e.g., thin-film transistors), pixel electrodes, and an alignment film arranged thereon. The switching elements are connected to a source line and a gate line intersecting each other. The pixel electrodes connected to the switching elements. The other of the substrates (CF substrate) 21 includes color filters, counter electrodes, and an alignment film. The color filters include coloring portions of R (red), G (green), and B (blue) provided in given arrangement. Moreover, paired polarizers 26 are provided outside of the both substrates 21, 22 individually. The liquid crystal panel 20 is oblong in a vertical direction in plan view, and includes an active area at a center portion of a screen where the image is displayed, and a non-active area at a frame-shaped circumferential portion that surrounds the active area of the screen where no image is displayed. A driver (drive circuit portion) 13 as a component for supplying various signals to the active area and a flexible substrate 14 as a flexible circuit board are bonded on the non-active area of the array substrate 22.

The following describes the configuration of the back light device 30. As illustrated in FIG. 1, the back light device 30 includes LEDs 52 (one example of light sources), LED substrates (light source substrate) 51 where the LEDs 52 are bonded, a plate-shaped light guide plate 60 where light from the LEDs 52 enters, an optical sheet 33 configured to apply predetermined optical action to light exiting from the light guide plate 60, a reflection sheet 70 configured to reflect leaked light toward the light guide plate 60, and a box-shaped frame 36 configured to surround the LEDs 52, the light guide plate 60, the optical sheet 33, and the like. The LEDs 52 are positioned individually in such a manner as to face paired side faces (a first side face 61 and a second side face 62) of the light guide plate 60. Light emitted from the LEDs 52 enters from the first side face 61 and the second side face 62 (light incident end faces), facing each other, into the light guide plate 60 where the light is guided toward the liquid crystal panel 20. Specifically, the back light device 30 according to this embodiment is an edge light type (side light type), i.e., a double-sided light incident type in which the light from the LEDs 52 enters both sides of the light guide plate 60 in a Y-axis direction. The following describes each component of the back light device 30 in detail.

The light guide plate 60 is an optical member made from a synthetic resin material (e.g., acrylic resin such as polymethyl methacrylate (PMMA) and polycarbonate) whose index of refraction is sufficiently higher than air and which is substantially transparent. As illustrated in a perspective view of FIG. 2, the light guide plate 60 is oblong in the vertical direction in plan view, which is similar to the liquid crystal panel 20. In addition, the light guide plate 60 has large plate shape with a thickness larger than that of the optical sheet 33. The light guide plate 60 guides light, emitted from the LEDs 52 along the Y-axis direction, from the first side face 61 and the second side face 62 constituting the light incident end faces, and moves light upwardly toward the optical sheet 33 while causing the light to propagate inside, thereby causing the light to exit from a front face (light exiting plate face) 63.

As illustrated in the perspective view of FIG. 2 and a plan view of FIG. 3, the first side face 61 and the second side face 62 of the light guide plate 60 are oblong in the vertical direction, and each include a recess portion 65 that forms a partially recessed shape at a center portion in its longitudinal direction (X-axis direction). A sectional view along the line I-I of FIG. 2 corresponds to sectional portions of the light guide plate 60, the LEDs 52 and the LED substrates 51 in FIG. 1. Here, the recess portion 65 provided in the first side face 61 is referred to as a first recess portion 65A, and the recess portion 65 provided in the second side face 62 is referred to as a second recess portion 65B. If these recess portions are not necessarily distinguished hut are described collectively, they are each referred to as the "recess portion 65".

As illustrated in the plan view of FIG. 3, the first recess portion 65A is configured to overlap the second recess portion 65B when rotating by 180 degrees about a central position P of the light guide plate 60 as the center in the plan view Accordingly, the first recess portion 65A and the second recess portion 65B are positioned in a rotationally symmetric manner with respect to the central position P as a symmetric point. Moreover, the first recess portion 65A and the second recess portion 65B are positioned in a line symmetric manner with respect to a line L as a symmetric axis. The line L passes the central position P and runs parallel to the first side face 61 and the second side face 62. It is preferred that the first recess portion 65A is formed to be equal in shape and size to the second recess portion 65B. In this embodiment, the recess portions are each formed in such a manner that corners thereof are recessed in a rounded rectangular shape in the same size.

As illustrated in FIGS. 2 and 3, a plurality of (seven each in FIG. 2) LEDs 52 is arranged in line on the LED substrates 51 at an equal interval. As illustrated in FIG. 1, the LED substrates 51 are disposed on a front side with respect to the frame 36 and the light guide plate 60, and are surrounded by these elements and the liquid crystal panel 20. The LED substrates 51 are in a form of a film (sheet) made of an insulating material. The LED substrates 51 extend partially along the light incident end faces (first side face 61, second side face 62) in a longitudinal direction. The LED substrates 51 are each constituted by an LED bonding portion 51A where the LEDs 52 are bonded, and a drawing portion 51B that is drawn from the LED bonding portion 51A toward the frame 36 in the Y-axis direction. The LED substrates 51 each include a rear face on which surface bonding of the LEDs 52 is performed and wiring pattern is provided for supplying power to the LEDs 52.

As illustrated in FIGS. 2 and 3, the LEDs 52 adjacent to the first side face 61 are arranged in such a manner as to face a portion of the first side face 61, except for the first recess portion 65A, between a first end 61A of the first side face 61 and the first recess portion 65A. Moreover, the LEDs 52 adjacent to the second side face 62 are arranged in such a manner as to face a portion of the second side face 62, except for the second recess portion 65B, between a first end 62B of the second side face 62 and the second recess portion 65B. When it is assumed that the portions of the first side face 61 and the second side face 62 except for the recess portions 65 and where the LEDs 52 face are each referred to as an LED arrangement area A1, and portions where the LEDs 52 do not face are each referred to an LED non-arrangement area A2, a portion between the first end 61A of the first side face 61 and the first recess portion 65A corresponds to the LED arrangement area A1, whereas a portion between the second end 61B of the first side face 61 and the first recess portion 65A corresponds to the LED non-arrangement area A2. Likewise, an area between the first end 62B of the second side face 62 and the second recess portion 65B corresponds to the LED arrangement area A1, and a portion between the second end 62A and the second recess portion 65B corresponds to the LED non-arrangement area A2.

As illustrated in FIGS. 2 and 3, the LEDs 52 are arranged on a first side face 61 side and a second side face 62 side in an offset manner. More specifically, in the +X-axis direction (from leftward to rightward in FIG. 3), the first side face 61 includes the LED arrangement area A1 and the LED non-arrangement area A2 in this order, whereas the second side face 62 includes the LED non-arrangement area A2 and the LED arrangement area A1 arranged in this order. That is, the first side face 61 differs from the second side face 62 in order of appearance of the LED arrangement area A1 and the LED non-arrangement area A2 along the +X-axis direction. In this specification, such arrangement is defined that the LEDs 52 are positioned in the offset manner at the region adjacent to the first side face 61 and the region adjacent to the second side face 62.

As illustrated in FIGS. 2 and 3, the number of the LEDs 52 arranged so as to face the first side face 61 is equal to the number of the LEDs 52 arranged so as to face the second side face 62. Such arrangement achieves no difference in luminance between the region adjacent to the first side face 61 and the region adjacent to the second side face 62 in the light guide plate 60.

As illustrated in FIG. 1, the reflection sheet 70 is arranged adjacent to a rear face 67 of the light guide plate 60. The reflection sheet 70 is formed in a sheet made from synthetic resin and includes a front face in white color with an excellent light reflecting property. The reflection sheet 70 reflects light, leaked from the LEDs 52 or the rear face 67 of the light guide plate 60, toward the light guide plate 60.

The optical sheet 33 is formed in a sheet with flexibility, and is disposed between the liquid crystal panel 20 and the light guide plate 60 as illustrated in FIG. 1. Accordingly, the optical sheet 33 causes light from the light guide plate to exit toward the liquid crystal panel 20 while applying predetermined optical action to the light. For instance, a diffusion sheet configured to diffuse light, a lens sheet configured to apply light collecting action to light, and wavelength conversion sheet configured to convert light to one with another wavelength are adoptable for the optical sheet 33. Alternatively, these sheets may be laminated for use as the optical sheet 33. A base material for each of various sheets as above is made of a synthetic resin material.

As described above, the back light device 30 according to this embodiment includes a plurality of LEDs 52, and the light guide plate 60 with the first side face 61 and the second side face 62, opposite to the first side face 61, and configured guide light from the LEDs 52. The light guide plate 60 includes the first recess portion 65A that forms a partially recessed shape in the first side face and the second recess portion 65B that forms a partially recessed shape in the second side face 62. The first recess portion 65A and the second recess portion 65B are positioned in a point symmetrical manner with respect to the central position P of the light guide plate 60 as the symmetric point in plan view. The LEDs 52 are arranged in such a manner as to face a portion of the first side face 61 except for the first recess portion 65A and a portion of the second side face 62 except for the second recess portion 65B, and are positioned in the offset manner at the region adjacent to the first side face 61 and the region adjacent to the second side face 62.

The recess portions 65 are disposed in the light guide plate 60 in such a manner as above, whereby other electronic components, such as a camera, various sensors, and a speaker are accommodatable in the recess portions 65 when the liquid crystal display device 10 is installed on electronic equipment such as a smartphone. This needs no additional space for installing these elements in the electronic equipment, leading to space-saving. Specifically, these electronic components are provided on a frame as an outer peripheral portion of the electronic equipment, and thus the recess portions 65 achieve a narrowed frame of the electronic equipment. Moreover, when the recess portions 65 are disposed in the paired side faces 61, 62 of the light guide plate 60 in a point symmetric manner with respect to the central position P of the light guide plate 60 as a symmetric point in plan view, enhanced design qualities of the screen of the liquid crystal display device 10 and the electronic equipment on which the screen is installed are obtainable. In addition, since vertical (or horizontal) flip generates less variation in shape of the screen, there is no need to pay attention for use to a difference generated upon the vertical (or horizontal) flip, leading to enhanced usability. Moreover, when the first recess portion 65A is formed to be equal in shape and size to the second recess portion 65B, there generates no variation in shape of the screen upon the vertical (or horizontal) flip. Accordingly, there is no need to pay attention to a difference generated upon the vertical (or horizontal) flip.

Figure 4:
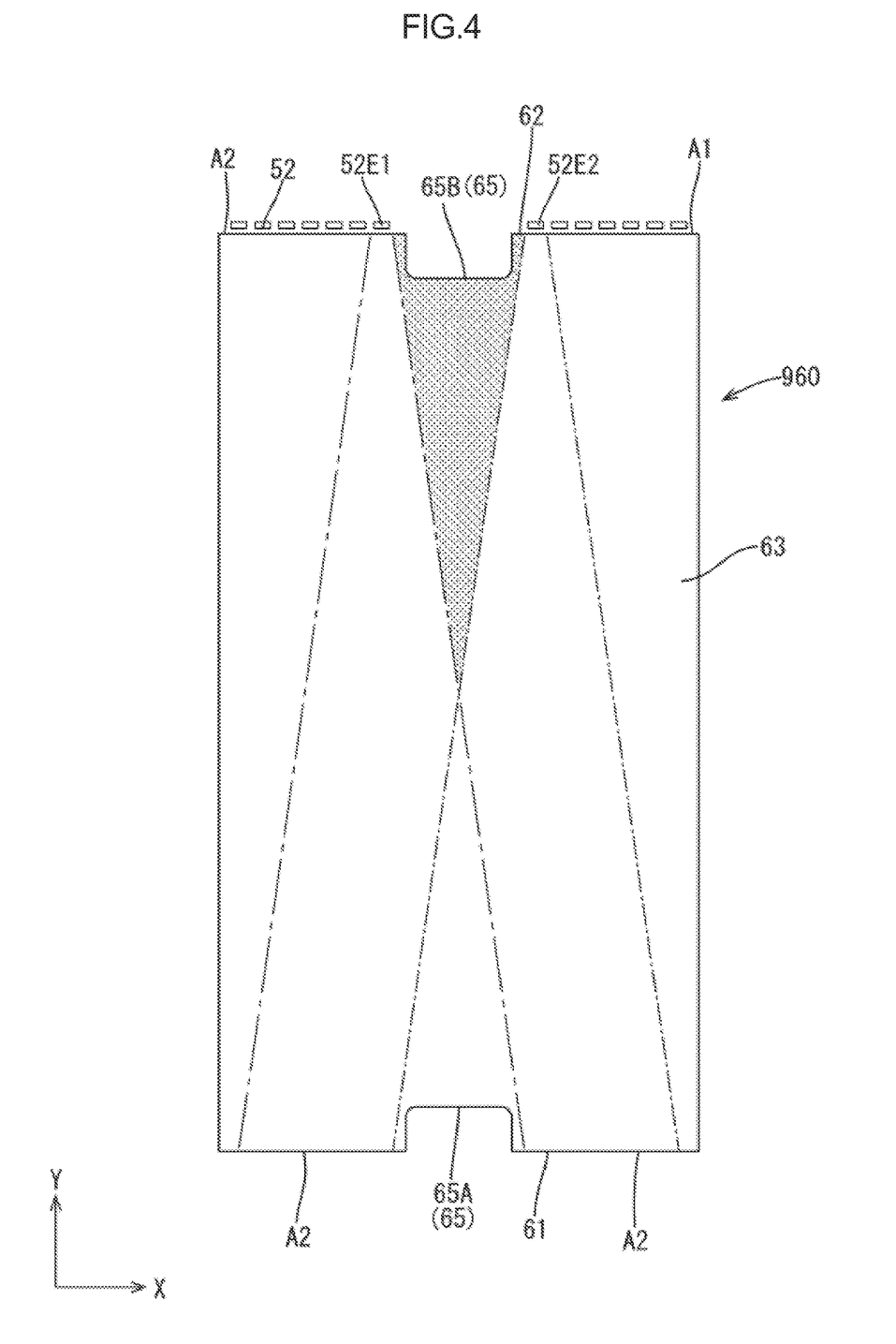
FIG. 4 is a plan view of a light guide plate and light sources according to a first comparative example.

However, in contrast to the light guide plate 60 with the recess portions 65 described above, when LEDs 52 are arranged on a light guide plate 960 according to a first comparative example in FIG. 4 in such a manner as to face only adjacent to the second side face 62 (all portions except for the second recess portion 65B), a distance between the adjacent LEDs 52 across the second recess portion 65B becomes long. This generates a dark area (a shading portion in FIG. 4) at a region near the second side face 62 of the light guide plate 60 that faces the second recess portion 65B. As irradiation areas of two adjacent LEDs 52E1, 52E2 across the second recess portion 65B are illustrated by alternate long and short dashed lines in FIG. 4, a portion where these irradiation areas do not overlap is the dark area.

Then, in this embodiment, the LEDs 52 are arranged on the first side face 61 side and on the second side face 62 in an offset manner, whereby suppressed production of the dark area described above is obtainable. More specifically, as illustrated by alternate long and short dashed lines in FIG. 3, there produces no portion where an irradiation area of one LED 52 of the LEDs 52 adjacent to the first side face 61 nearest to the first recess portion 65A does not overlap an irradiation area of one LED 52 of the LEDs 52 adjacent to the second side face 62 nearest to the second recess portion 65B. Accordingly, suppression in production of the dark area is obtainable in the light guide plate 60.

Moreover, the LEDs 52 are positioned in the offset manner as above, whereby the number of LEDs 52 to be used is suppressible while suppressed production of the dark area is obtainable. Even if the LEDs 52 are arranged in such a manner as to face all the portions in the second side face 62 except for the second recess portion 65B and all the portions in the first side face 61 except for the first recess portion 65A, no dark area is produced also in this case, but the number of LEDs 52 to be used is increased.

<First Modification>

Figure 5:
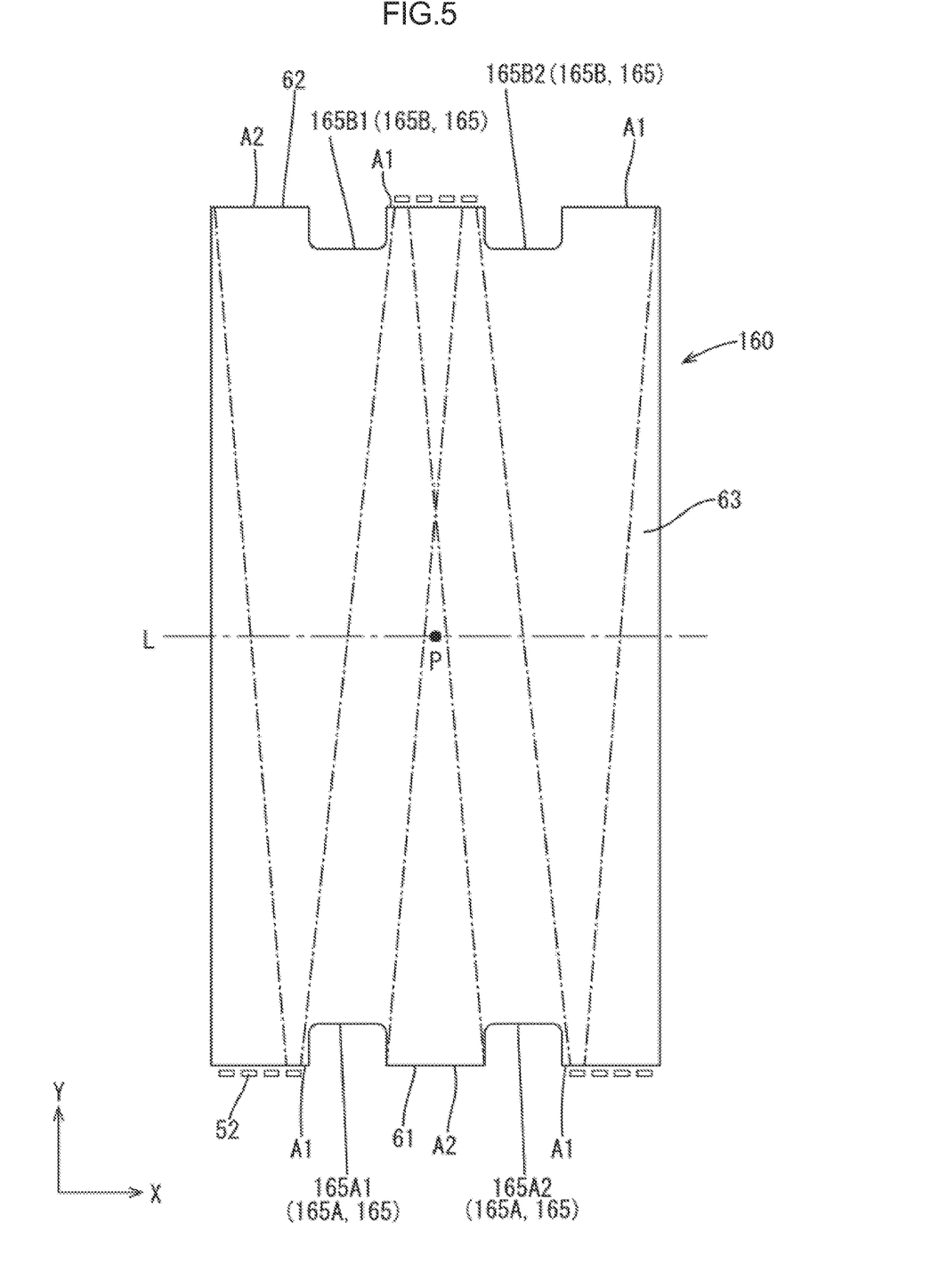
FIG. 5 is a plan view of a light guide plate and light sources according to a first modification.

The following describes a light guide plate 160 and LEDs 52 according to a first modification with reference to FIG. 5. In the first modification, the number of recess portions 165 is increased than the number thereof in first embodiment described above. Here, the description of the configuration and operational advantage common to that of the first embodiment is to be omitted.

As illustrated in FIG. 5, a plurality of (two) recess portions 165 are each formed in a first side face 61 and a second side face 62 of a light guide plate 160, respectively. The first side face 61 includes a first recess portion 165A formed by two recess portions 165A1, 165A2, whereas second side face 62 includes a second recess portion 165B formed by two recess portions 165B1, 165B2. The first recess portions 165A1, 165A2 and the second recess portions 165B1, 165B2 are positioned in a point symmetrical manner with respect to a central position P of the light guide plate 160 as a symmetric point in plan view. Moreover, the first recess portions 165A1, 165A2 and the second recess portions 165B1, 165B2 are positioned in a line symmetric manner with respect to a line L as a symmetric axis. The line passes the central position P and runs parallel to the first side face 61 and the second side face 62. In the +X-axis direction (from leftward to rightward in FIG. 5), the first side face 61 includes an LED arrangement area A1, an LED non-arrangement area A2, and an LED arrangement area A1 arranged in this order, whereas the second side face 62 includes an LED non-arrangement area A2, an LED arrangement area A1, and an LED non-arrangement area A2 arranged in this order. Accordingly, also in this modification, the LEDs 52 are arranged on the first side face 61 side and on the second side face 62 in an offset manner. More specifically, as illustrated by alternate long and short dashed lines in FIG. 5, there produces no portion where irradiation areas of the LEDs nearest to the recess portions 165 do not overlap. Accordingly, suppressed production of the dark area is obtainable in the light guide plate 160.

The number of the recess portions 165 increases as in this modification, whereby more additional electronic components, such as a camera, various sensors, and a speaker are accommodatable when the liquid crystal device installed on electronic equipment such as a smartphone.

<Second Modification>

Figure 6:
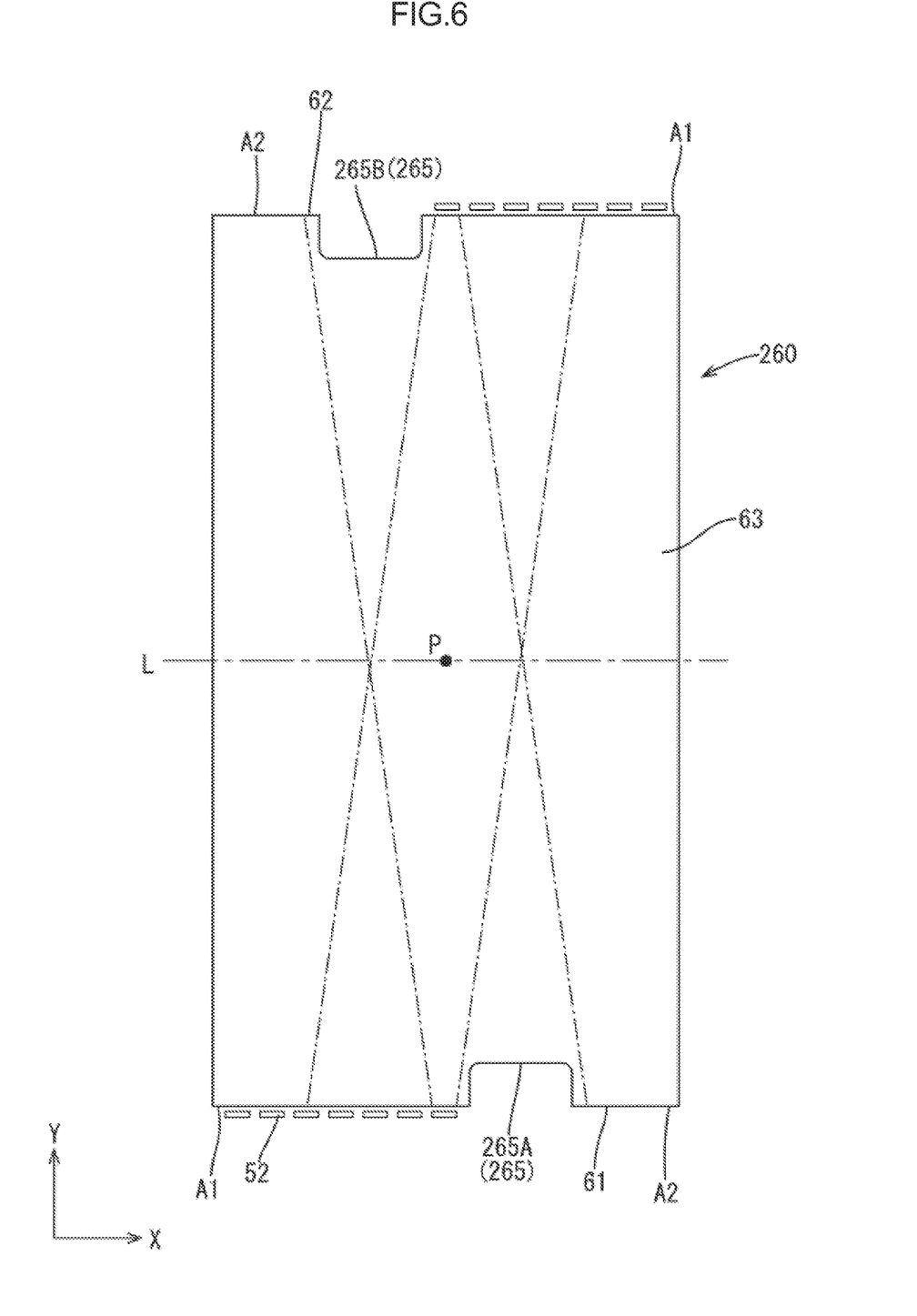
FIG. 6 is a plan view of a light guide plate and light sources according to a second modification.

The following describes a light guide plate 260 and LEDs 52 according to a second modification with reference to FIG. 6. In the second modification, the position of recess portions 265 is changed from that in the first embodiment described above. Here, the description of the configuration and operational advantage common to that of the first embodiment and the first modification described above is to be omitted.

As illustrated in FIG. 6, a light guide plate 260 includes a first side face 61 and a second side face 62 each including one recess portion 265 except for the center in its longitudinal direction (X-axis direction). A first recess portion 265A and a second recess portion 265B are positioned in a point symmetric manner with respect to a central position P of the light guide plate 60 as a symmetric point in plan view, but is not positioned in a line symmetric manner with respect to a line L as a symmetric axis, which differs from the configuration of the first embodiment and the first modification. Here, the line L passes through the central position P and runs parallel to the first side face and the second side face 62. In the +X-axis direction (from leftward to rightward in FIG. 6), the first side fare includes an LED arrangement area A1 and an LED non-arrangement area A2 arranged in this order, whereas the second side face 62 includes an LED non-arrangement area A2 and an LED arrangement area A1 arranged in this order. Accordingly, also in this modification, the LEDs 52 are arranged on the first side face 61 side and on the second side face 62 side in an offset manner. Moreover, as illustrated by alternate long and short dashed lines in FIG. 6, there produces no portion where irradiation areas of the LEDs 52 nearest to the recess portions 265 do not overlap. Accordingly, suppressed production of the dark area is obtainable in the light guide plate 260.

Here, comparison between the second modification and the first embodiment reveals that, in the first embodiment, the recess portions 65 are disposed at the center portions of the first side face 61 and the second side face 62, respectively, whereby suppressed production of the dark area in light guide plate 60 is obtainable while the number of the LEDs to be used is made minimum.

Other Embodiments

The present technology is limited to the embodiments described above with the description and the drawings. Such embodiments as under are contained in the technical scope.

(1) In the embodiments and the modifications described above, the number of the recess portions disposed in the light guide plate is one or two for one side face. Alternatively, the number may be three or more. Moreover, the above embodiments and the above modifications describe one example that the recess portions are disposed adjacent to paired short sides in the rectangular light guide plate. Alternatively, the recess portions may be disposed adjacent to paired long sides.

(2) The above embodiments and the above modifications describe one example that all the recess portions disposed in the light guide plate are the same in shape and size. However, it is not always necessary that all the recess portions are the same in shape and size. For instance, the following configuration may be adopted in the first modification. That is, one recess portion 165A1 of the recess portions in the first side face is formed large and the other recess portion 165A2 is formed small, and then one recess portion 165B1 of the recess portions in second first side face is formed small and the other recess portion 165B2 is formed large so as to be point symmetric with the recess portions 165A1 and 165A2, respectively.

(3) The above embodiments and the above modifications describe one example that the liquid crystal panel has a screen size categorized as a small type, but such a liquid crystal panel categorized as a middle to large type is applicable.

The invention claimed is:

1. A lighting device, comprising:
   light sources; and
   a light guide plate having a first side face and a second side face opposite to the first side face, the light guide plate being configured to guide light from the light sources, the light guide plate including at least one first recess portion having a depressed shape in a part of the first side face and at least one second recess portion having a depressed shape in a part of the second side face, wherein
   the first recess portion and the second recess portion are disposed in a point symmetrical manner with respect to a central position of the light guide plate as a symmetric point in a plan view, and
   the light sources are arranged in such a manner as to face a portion of the first side face except for the first recess portion and a portion of the second side face except for the second recess portion, and are arranged on a first side face side and on a second side face side in an offset manner.

2. The lighting device according to claim 1, wherein the first recess portion and the second recess portion are positioned in a line symmetrical manner with respect to a line as a symmetric axis, the line passing through the central position of the light guide plate and running in parallel to the first side face and the second side face.

3. The lighting device according to claim 1, wherein
   the first recess portion is disposed in a middle portion of the first side face, and
   the second recess portion is disposed in a middle portion of the second side face.

4. The lighting device according to claim 1, wherein the first recess portion and the second recess portion have a same shape and a same size.

5. The lighting device according to claim 1, wherein a number of the light sources arranged to face the first side face is equal to a number of the light sources arranged to face the second side face.

6. A display device, comprising:
   the lighting device according to claim 1; and
   a display panel configured to display an image with use of light exiting from the lighting device.

* * * * *